United States Patent

Roesler et al.

(10) Patent No.: US 7,465,778 B2
(45) Date of Patent: *Dec. 16, 2008

(54) SILANTE TERMINATED POLYURETHANE

(75) Inventors: Richard R. Roesler, Wexford, PA (US); Derek L. Crawford, Oakdale, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 355 days.

This patent is subject to a terminal disclaimer.

(21) Appl. No.: 10/741,871

(22) Filed: Dec. 19, 2003

(65) Prior Publication Data

US 2005/0137323 A1  Jun. 23, 2005

(51) Int. Cl.
- B05D 3/02 (2006.01)
- B32B 7/12 (2006.01)
- C08G 18/08 (2006.01)
- C08G 18/28 (2006.01)
- C08G 77/04 (2006.01)
- C08J 3/00 (2006.01)
- C08K 3/20 (2006.01)
- C08L 75/00 (2006.01)
- C08L 83/00 (2006.01)
- C08L 83/04 (2006.01)
- C09J 4/00 (2006.01)
- C09J 101/00 (2006.01)
- C09J 201/00 (2006.01)

(52) U.S. Cl. ...... 528/28; 156/327; 156/330.9; 156/329; 156/331.1; 156/331.7; 427/372.2; 427/385.5; 428/423.1; 524/588; 524/589; 524/590; 524/591; 524/840

(58) Field of Classification Search ...... 524/588, 524/589, 590, 591, 839, 840; 528/28; 427/372.2, 427/385.5; 428/423.1; 156/327, 330.9, 329, 156/331.1, 331.4, 331.7
See application file for complete search history.

(56) References Cited

U.S. PATENT DOCUMENTS

| | | | |
|---|---|---|---|
| 3,278,457 A | 10/1966 | Milgrom | 260/2 |
| 3,278,458 A | 10/1966 | Belner | 260/2 |
| 3,278,459 A | 10/1966 | Herold | 260/2 |
| 3,427,256 A | 2/1969 | Milgrom | 252/431 |
| 3,427,334 A | 2/1969 | Belner | 260/429 |
| 3,427,335 A | 2/1969 | Herold | 260/429 |
| 3,829,505 A | 8/1974 | Herold | 260/611 B |
| 3,941,849 A | 3/1976 | Herold | 260/607 A |
| 4,355,188 A | 10/1982 | Herold et al. | 568/620 |
| 4,472,560 A | 9/1984 | Kuyper et al. | 526/120 |
| 4,721,818 A | 1/1988 | Harper et al. | 568/120 |
| 4,843,054 A | 6/1989 | Harper | 502/175 |
| 4,857,623 A | 8/1989 | Emmerling et al. | 528/28 |
| 6,590,028 B1 | 7/2003 | Probst et al. | 524/589 |
| 2003/0024154 A1 | 2/2003 | Combs et al. | 44/443 |
| 2003/0039846 A1 | 2/2003 | Roesler et al. | 428/447 |
| 2003/0153671 A1 | 8/2003 | Kaszubski et al. | 524/492 |
| 2003/0173026 A1 | 9/2003 | Wu et al. | 156/326 |
| 2003/0232949 A1 | 12/2003 | Roesler et al. | 528/28 |

FOREIGN PATENT DOCUMENTS

WO  98/18843  5/1998

*Primary Examiner*—Patrick D Niland
(74) *Attorney, Agent, or Firm*—Lyndanne M. Whalen

(57) ABSTRACT

A curable, alkoxysilane-functional polyether urethane composition formed by combining a) a first silane terminated polyurethane prepared by reacting i) a mono-functional compounds with ii) an isocyanate component containing two isocyanate groups, the reaction product reacted with iii) a compound containing an isocyanate-reactive group and one or more reactive silane groups to form a moisture-curable, alkoxysilane-functional polyether urethane; and b) a second silane terminated polyurethane prepared by reacting i) an alkyl monofunctional alcohol, amine, and/or thiol, with ii) an isocyanate component containing two isocyanate groups, the reaction product reacted with iii) a compound containing an isocyanate-reactive group and one more reactive silane groups. The urethane composition can be used in coating, sealant and/or adhesive compositions. The coating compositions are used to form a coated substrate. The sealant and/or adhesive compositions are used in a method of joining a first adherend and a second adherend to form a bonded assembly.

24 Claims, No Drawings

SILANTE TERMINATED POLYURETHANE

BACKGROUND OF THE INVENTION

1. Field of the Invention

The present invention relates to alkoxysilane-functional urethane compositions and in particular to alkoxysilane-functional urethane compositions useful in adhesive, sealant and coating compositions.

2. Background Art

Adhesives are commonly used to join or fasten two or more adherends. Adherends are considered as being any two or more materials, or pieces of material that are being joined together, including wood, metals, plastics, paper, ceramics, stone, glass, concrete, etc. Adhesives used for these purposes are based on a wide range of technologies, including elastomer/solvent/resin mixtures, epoxies, latexes, polyurethanes, silicones, cyanoacrylates, acrylics, hot melts, and others. Such adhesives can have one or more drawback, such as they may contain solvents which are toxic and often flammable, they can be incompatible with one or more classes of adherends, they can have undesirably long cure times and in many cases the bonds they form of are of insufficient strength.

It is often desirable for coatings applied to substrates to provide a desirable appearance, in many cases by applying multiple coating layers, the last of which can be a pigmented or unpigmented topcoat. Unfortunately, as the article containing the coated substrate ages, scratches that occur through normal "wear and tear", tend to deteriorate the appearance of the coated surface of the substrate, A sealant is typically a thin film, often containing a plastic, that is applied onto one or more surfaces on one or more substrates to prevent passage of a liquid or gas through the film. The sealant can be used to prevent exposure of the substrate or is often additionally used to prevent exposure via defects in a substrate or between gaps that can exist between substrates.

U.S. Pat. No. 6,590,028 to Probst, et al. discloses an aqueous two-component polyurethane systems, a process for their production, and their use for the production of coatings having increased impact strength, high stability properties and outstanding optical properties.

U.S. Published Patent Application 2003/0039846 A1 to Roesler et al. discloses a two-component coating compositions containing a polyisocyanate component, an isocyanate-reactive component that contains less than 3% by weight of an aromatic polyamine and 0.1 to 1.8 wt. %, based on the weight of the other components of a compound containing at least one epoxy group and at least one alkoxysilane group.

U.S. Published Patent Application 2003/0173026 A1 to Wu et al. discloses silane functional adhesive compositions for bonding a window to a painted substrate. The process includes applying to the glass or the substrate the silane functional adhesive composition; contacting the glass with the substrate; and allowing the adhesive to cure.

U.S. Published Patent Application 2003/0153671 A1 to Kaszubski et al. discloses a moisture curable adhesive that includes a polymer containing reactive silicon end groups; a clear filler; and a dehydrating agent.

However, both initially and especially after exposure to the elements, heretofore known adhesive, sealant and coating compositions do not provide sufficient tensile strength and/or elongation to break properties to protect substrates onto which they have been applied. As a result, cured films derived from such adhesive, sealant and coating compositions are prone to crack, blister and or chip, leaving the underlying substrate exposed.

Therefore, there is an established need in the art for adhesive, sealant and coating compositions that provide coating films with excellent tensile strength and elongation to break properties both initially and after exposure to the elements.

SUMMARY OF THE INVENTION

The present invention is directed to a curable, alkoxysilane-functional polyether urethane composition formed by combining a) a first silane terminated polyurethane prepared by reacting:
  i) mono-functional compounds selected from the group consisting of polyethers, polyamines, amine terminated polyethers, or polysulfides having hydroxyl, amine or thiol functional groups, and mixtures thereof, having a number average molecular weight of from 500 to 20,000, with
  ii) an isocyanate component containing two isocyanate groups, the reaction product of i) and ii) reacted with
  iii) a compound containing an isocyanate-reactive group and one more reactive silane groups in which at least 10 mole % of component iii) is a compound corresponding to formula (I)

wherein

X represents identical or different organic groups which are inert to isocyanate groups below 100° C., provided that at least two of these groups are alkoxy or acyloxy groups, Y represents a linear or branched alkylene group containing 1 to 8 carbon atoms and $R_1$ represents an organic group which is inert to isocyanate groups at a temperature of 100° C. or a group corresponding to formula II

to form a moisture-curable, alkoxysilane-functional polyether urethane; and b) a second silane terminated polyurethane prepared by reacting:
  i) a $C_1$-$C_{20}$ linear, branched or cyclic alkyl monofunctional alcohol, amine, and/or thiol, with
  ii) an isocyanate component containing two isocyanate groups, the reaction product of i) and ii) reacted with
  iii) a compound containing an isocyanate-reactive group and one more reactive silane groups corresponding to formula (I) as defined above.

The present invention is also directed to a coating composition, sealant composition or adhesive composition that includes the above-described curable, alkoxysilane-functional polyether urethane composition and one or more components selected from pigments, plasticizers, and fillers.

In a further embodiment of the invention, the above-described coating composition is applied to at least a portion of a surface of a substrate to form a coated substrate.

An additional embodiment of the invention, is directed to a method of joining a first adherend and a second adherend that includes:

applying the above-described adhesive composition to at least a portion of a surface of the first adherend and to at least a portion of a surface of the second adherend;

contacting the adhesive composition containing surface of the first adherend with the adhesive composition containing surface of the second adherend to form a bonded assembly; and curing the adhesive compositions in the bonded assembly.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

Embodiments of the present invention provide a curable, alkoxysilane-functional polyether urethane composition formed by combining a) a first silane terminated polyurethane; and b) a second silane terminated polyurethane.

As used herein, the term "silane group" refers to a silane group containing at least two alkoxy or acyloxy groups, which in some instances herein are defined by substituent "X". A silane group containing two or three alkoxy and/or acyloxy groups is considered to be one reactive silane group. In an embodiment of the invention, X is a group according to the formula —O—$R^{10}$, where $R^{10}$ is selected from $C_1$-$C_5$ linear and branched alkyl.

As used herein, the term "urethane" refers to a compound containing one or more urethane and/or urea groups. Non-limiting examples of urethanes that can be used in the invention include compounds that contain one or more urethane groups and optionally contain urea groups as well as compounds contain both urethane and urea groups.

In an embodiment of the invention, the first silane terminated polyurethane (a) can be prepared by reacting:

i) mono-functional compounds selected from polyethers, polyamines, amine terminated polyethers, or polysulfides having hydroxyl, amine or thiol functional groups, and mixtures thereof, having a number average molecular weight of from 500 to 20,000, with ii) an isocyanate component containing two isocyanate groups.

In an embodiment of the invention, the mono-functional compounds can have a number average molecular weight of at least 500, in some cases at least 1,000 and in other cases at least 1,500. Also, the mono-functional compounds can have a number average molecular weight of up to 20,000, in some cases up to 17,500, and in other cases up to 15,000. The number average molecular weight is determined by using Gel Permeation Chromatography (GPC) using polystyrene standards.

In an embodiment of the invention, the reaction product of i) and ii) is reacted with iii) a compound containing an isocyanate-reactive group and one more reactive silane groups in which at least 10 mole % of component iii) is a compound corresponding to formula (I)

where

X represents identical or different organic groups which are inert to isocyanate groups below 100° C., provided that at least two of these groups are alkoxy or acyloxy groups, In particular embodiments of the invention, one or more "X" groups are a group according to the formula —O—$R^{10}$, where $R^{10}$ is selected from $C_1$-$C_5$ linear and branched alkyl.

Y represents a linear or branched alkylene group containing 1 to 8 carbon atoms and $R^1$ represents an organic group which is inert to isocyanate groups at a temperature of 100° C. or a group corresponding to formula II

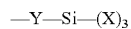

where Y and X are defied as above.

As used herein the term "alkyl" refers to a monovalent radical of an aliphatic hydrocarbon chain of general formula $C_sH_{2s+1}$, where s is the number of carbon atoms, or ranges therefore, as specified. The term "substituted alkyl" refers to an alkyl group, where one or more hydrogens are replaced with a non-carbon atom or group, non-limiting examples of such atoms or groups include halides, amines, alcohols, oxygen (such as ketone or aldehyde groups), and thiols.

As used herein the term "cycloalkyl" refers to a monovalent radical of an aliphatic hydrocarbon chain that forms a ring of general formula $C_sH_{2s-1}$, where s is the number of carbon atoms, or ranges therefore, as specified. The term "substituted cycloalkyl" refers to a cycloalkyl group, containing one or more hetero atoms, non-limiting examples being —O—, —NR—, and —S— in the ring structure, and/or where one or more hydrogens are replaced with a non-carbon atom or group, non-limiting examples of such atoms or groups include halides, amines, alcohols, oxygen (such as ketone or aldehyde groups), and thiols. R represents an alkyl group of from 1 to 24 carbon atoms.

As used herein, the term "aryl" refers to a monovalent radical of an aromatic hydrocarbon. Aromatic hydrocarbons include those carbon based cyclic compounds containing conjugated double bonds where 4t+2 electrons are included in the resulting cyclic conjugated pi-orbital system, where t is an integer of at least 1. As used herein, aryl groups can include single aromatic ring structures, one or more fused aromatic ring structures, covalently connected aromatic ring structures, any or all of which can include heteroatoms. Non-limiting examples of such heteroatoms that can be included in aromatic ring structures include O, N, and S.

As used herein, the term "alkylene" refers to acyclic or cyclic divalent hydrocarbons having a carbon chain length of from $C_1$ (in the case of acyclic) or $C_4$ (in the case of cyclic) to $C_{25}$, typically $C_2$ to $C_{12}$, which may be substituted or unsubstituted, and which may include substituents. As a non-limiting example, the alkylene groups can be lower alkyl radicals having from 1 to 12 carbon atoms. As a non-limiting illustration, "propylene" is intended to include both n-propylene and isopropylene groups; and, likewise, "butylene" is intended to include both n-butylene, isobutylene, and t-butylene groups.

As used herein, the term "oxyalkylene" refers to an alkylene group containing one or more oxygen atoms. The term "aralkylene" refers to a divalent aromatic group, which may be ring-substituted. The term "alkylene aryl" refers to any acyclic alkylene group containing at least one aryl group, as a non-limiting example, phenyl.

Embodiments of the invention provide that the product obtained by reacting the reaction product of i) and ii) with iii) is a moisture-curable, alkoxysilane-functional polyether urethane.

In an embodiment of the invention, the mono-functional compounds in a-i) can have a structure according to formula (III):

 (III)

where $R^2$ is selected from $C_1$-$C_{22}$ linear branched or cyclic alkyl, aryl, aralkyl, alkaryl, and alkenyl; each occurrence of $R^3$ is independently selected from H, methyl and ethyl, and each occurrence of Z is independently selected from O, S and —$NR^4$—, where $R^4$ is selected from H, methyl, ethyl, propyl, n-butyl and t-butyl. The subscript n is an integer and can be from 1 to 5, in some cases 1 to 4, in other cases 1 to 3, in some situations 1 or 2, in other situations from 2 to 4 and in some instances from 2 to 5. The subscript m is an integer an can be at least 1, in some cases at least 2, in other cases at least 3, in some situations at least 4, and in other situations at least 5. Also, the subscript m can be up to 1,000, in some cases up to 750, in other cases up to 500 and in some situations up to 250. The value of the subscript m can be any value stated above or range between the set of values indicated above.

In a particular embodiment of the invention, the mono-functional compounds in a-i) is a monohydroxy-functional polyether. In a specific embodiment, the polyether can be a poly(propyleneoxide) and/or a poly(ethyleneoxide).

Suitable polyethers that can be used in the invention include having a number average molecular weight of at least 250, in some cases at least 500 and in other cases at least 1,000. Also, the number average molecular weight of the polyether polyol can be up to 20,000, in some cases up to 15,000 and in other cases up to 12,000. The number average molecular weight of the polyether polyol can vary and range between any of the values recited above.

In an embodiment of the invention, the polyethers have a maximum total degree of unsaturation of 0.1 milliequivalents/g (meq/g) or less, in some cases less than 0.04 (meq/g) in other cases less than 0.02 meq/g, in some situations less than 0.01 meq/g, in other situations 0.007 meq/g or less, and in particular situations 0.005 meq/g or less. The amount of unsaturation will vary depending on the method used to prepare the polyether as well as the molecular weight of the polyether. Such polyethers are known and can be produced by, as a non-limiting example, the ethoxylation and/or propoxylation of suitable starter molecules. Non-limiting examples of suitable starter molecules include aliphatic, cycloaliphatic and araliphatic alcohols, phenol and substituted phenols, such as methanol, ethanol, the isomeric structures of propanol, butanol, pentanol and hexanol, cyclohexanol and higher molecular weight compounds such as nonylphenol, 2-ethylhexanol and a mixture of $C_{12}$ to $C_{15}$, linear, primary alcohols (a non-limiting example being NEODOL® 25, available from Shell Chemical Company, Houston, Tex.). Also suitable are unsaturated alcohols such as allyl alcohol; and hydroxy functional esters such as hydroxyethyl acetate and hydroxyethyl acrylate. Preferred are the higher molecular weight monohydroxy compounds, especially nonyl phenol and mixtures of $C_{12}$ to $C_{15}$, linear, primary alcohols.

In an embodiment of the invention, the polyethers are prepared using a method described in one or more of EP-A 283 148, and U.S. Pat. Nos. 3,278,457, 3,427,256, 3,829,505, 4,472,560, 3,278,458, 3,427,334, 3,941,849, 4,721,818, 3,278,459, 3,427,335 and 4,355,188, the disclosures of which are herein incorporated by reference. In a particular embodiment, the polyethers are prepared using double metal cyanides as catalysts.

In an embodiment of the invention, component a-i) is present at a level of at least 40 percent, in some cases at least 45 percent and in other cases at least 50 percent by weight of the composition. Also, component a-i) is present at a level of up to 99 percent, in some cases up to 95 weight percent, in other cases up to 90 percent, in some situations up to 85 percent and in other situations up to 80 percent by weight of the composition. The amount of component a-i) in the composition can be any value recited above and can range between any of the values recited above.

In an embodiment of the invention, component a-ii) is present at a level of at least 0.5 percent, in some cases at least 1 percent and in other cases at least 2.5 percent by weight of the composition. Also, component a-ii) is present at a level of up to 30 percent, in some cases up to 25 weight percent, and in other cases up to 20 percent by weight of the composition. The amount of component a-ii) in the composition can be any value recited above and can range between any of the values recited above.

In an embodiment of the invention, component a-iii) is present at a level of at least 0.5 percent, in some cases at least 1 percent and in other cases at least 2.5 percent by weight of the composition. Also, component a-iii) is present at a level of up to 35 percent, in some cases up to 30 weight percent, in other cases up to 25 percent, and in some situations up to 20 percent by weight of the composition. The amount of component a-iii) in the composition can be any value recited above and can range between any of the values recited above.

In an embodiment of the invention, the NCO:OH equivalent ratio of a-ii) to a-i) is at least 1.5:1, in some cases at least 1.6:1, and in other cases at least 1.75:1. Also, the NCO:OH equivalent ratio for a-ii) to a-i) can be up to 2.5:1, in some cases up to 2.4:1, in other cases up to 2.25:1, and in some situations up to 2.1:1. The NCO:OH equivalent ratio for a-ii) to a-i) can be any value recited above and can range between any of the values recited above.

In an embodiment of the invention, the NCO:NH equivalent ratio of a-ii) to a-i) is at least 1.5:1, in some cases at least 1.6:1, and in other cases at least 1.75:1. Also, the NCO:NH equivalent ratio for a-ii) to a-i) can be up to 2.5:1, in some cases up to 2.4:1, in other cases up to 2.25:1, and in some situations up to 2.1:1. The NCO:NH equivalent ratio for a-ii) to a-i) can be any value recited above and can range between any of the values recited above.

In an embodiment of the invention, the first silane terminated polyurethane a) is present at a level of at least 45 percent, in some cases at least 50 percent and in other cases at least 55 percent by weight of the composition. Also, the first silane terminated polyurethane a) is present at a level of up to 90 percent, in some cases up to 85 weight percent, in other cases up to 80 percent, and in some situations up to 75 percent by weight of the composition. The amount of the first silane terminated polyurethane a) in the composition can be any value recited above and can range between any of the values recited above.

In an embodiment of the invention, the second silane terminated polyurethane b) is prepared by reacting:
i) a $C_1$-$C_{20}$ linear, branched or cyclic alkyl monofunctional alcohol, amine, and/or thiol, with
ii) an isocyanate component containing two isocyanate groups, the reaction product of i) and ii) reacted with iii) a compound containing an isocyanate-reactive group and one more reactive silane groups corresponding to formula (I) as defined above.

In an embodiment of the invention, component b-i) is present at a level of at least 2 percent, in some cases at least 3 percent and in other cases at least 5 percent by weight of the composition. Also, component b-i) is present at a level of up to 30 percent, in some cases up to 25 weight percent, and in other cases up to 20 percent: by weight of the composition. The amount of component b-i) in the composition can be any value recited above and can range between any of the values recited above.

In an embodiment of the invention, component b-ii) is present at a level of at least 25 percent, in some cases at least 30 percent and in other cases at least 35 percent by weight of the composition. Also, component b-ii) is present at a level of up to 60 percent, in some cases up to 55 weight percent, and in other cases up to 50 percent by weight of the composition. The amount of component b-ii) in the composition can be any value recited above and can range between any of the values recited above.

In an embodiment of the invention, component b-iii) is present at a level of at least 20 percent, in some cases at least 25 percent and in other cases at least 30 percent by weight of the composition. Also, component b-iii) is present at a level of up to 65 percent, in some cases up to 60 weight percent, in other cases up to 55 percent, and in some situations up to 50 percent by weight of the composition. The amount of component b-iii) in the composition can be any value recited above and can range between any of the values recited above.

In an embodiment of the invention, the NCO:OH equivalent ratio of b-ii) to b-i) is at least 1.5:1, in some cases at least 1.6:1, and in other cases at least 1.75:1. Also, the NCO:OH equivalent ratio for b-ii) to b-i) can be up to 2.5:1, in some cases up to 2.4:1, in other cases up to 2.25:1, and in some situations up to 2.1:1. The NCO:OH equivalent ratio for b-ii) to b-i) can be any value recited above and can range between any of the values recited above.

In an embodiment of the invention, the NCO:NH equivalent ratio of b-ii) to b-i) is at least 1.5:1, in some cases at least 1.6:1, and in other cases at least 1.75:1. Also, the NCO:NH equivalent ratio for b-ii) to b-i) can be up to 2.5:1, in some cases up to 2.4:1, in other cases up to 2.25:1, and in some situations up to 2.1:1. The NCO:NH equivalent ratio for b-ii) to b-i) can be any value recited above and can range between any of the values recited above.

In an embodiment of the invention, the second silane terminated polyurethane b) is present at a level of at least 10 percent, in some cases at least 15 percent, in other cases at least 20 percent, and in some situations at least 25 percent by weight of the composition. Also, the second silane terminated polyurethane b) is present at a level of up to 55 percent, in some cases up to 50 weight percent, and in other cases up to 45 percent by weight of the composition. The amount of the second silane terminated polyurethane b) in the composition can be any value recited above and can range between any of the values recited above.

In an embodiment of the invention, the isocyanate component containing two isocyanate groups of a-ii) and b-ii) includes, but is not limited to, organic diisocyanates represented by formula (IV):

$$R^5(NCO)_2 \quad (IV)$$

where $R^5$ represents an organic group obtained by removing the isocyanate groups from an organic diisocyanate having a molecular weight of from about 112 to 1,000, in some cases from about 140 to 400.

In an embodiment of the invention, the diisocyanates are those represented by the above formula in which $R^5$ represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Further to this embodiment, the suitable organic diisocyanates can include 1,4-tetramethylene diisocyanate, 1,6-hexamethylene diisocyanate, 2,2,4-trimethyl-1,6-hexamethylene diisocyanate, 1,1 2-dodecamethylene diisocyanate, cyclohexane-1,3-and-1,4-diisocyanate, 1-isocyanato-2-isocyanatomethyl cyclopentane, 1-isocyanato-3-isocyanatomethyl-3,5,5-trimethyl-cyclohexane(isophorone diisocyanate or IPDI), bis-(4-isocyanato-cyclohexyl)-methane, 1,3-and 1,4-bis-(isocyanatomethyl)-cyclohexane, bis-(4-isocyanato-cyclohexyl)-methane, 2,4'-diisocyanato-dicyclohexyl methane, bis-(4-isocyanato-3-methyl-cyclohexyl)-methane, α,α,α',α'-tetramethyl-1,3-and/or-1,4-xylylene diisocyanate, 1-isocyanato-1-methyl-4(3)-isocyanatomethyl cyclohexane, 2,4-and/or 2,6-hexahydro-toluylene diisocyanate, 1,3-and/or 1,4-phenylene diisocyanate, 2,4-and/or 2,6-toluylene diisocyanate, 2,4-and/or 4,4'-diphenylmethane diisocyanate and 1,5-diisocyanato naphthalene and mixtures thereof.

In some embodiments of the invention, small amounts, i.e., up to 5%, in some cases from 0.1% to 5%, and in other cases from 0.5% to 3.5% based on the weight of total isocyanate containing compounds, of optional polyisocyanates containing 3 or more isocyanate groups can be used. Non-limiting examples of suitable polyisocyanates that can be used include 4-isocyanatbmethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates.

In a particular embodiment of the invention, the diisocyanates include bis-(4-isocyanatocyclohexyl)-methane, 1,6-hexamethylene diisocyanate and isophorone diisocyanate, especially bis-(4-isocyanatocyclohexyl)-methane and isophorone diisocyanate.

In an embodiment of the invention, the mono-functional compound in b-i) is a $C_1$-$C_{20}$, in some cases $C_2$-$C_{16}$, linear, branches of cyclic alkyl molecule containing one hydroxyl, amine, or thiol group. Non-limiting examples of suitable mono-functional compounds for b-i include ethanol, n-propanol, n-butanol, t-butanol, n-propyl amine, n-butyl amine, t-butyl amine, n-propyl mercaptan, n-butyl mercaptan, t-butyl mercaptan and mixtures thereof.

In an embodiment of the invention, the compound of a-iii) and b-iii) can include a compound according to structure (V):

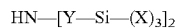

wherein Y and X are defined as above.

In a particular embodiment, the compounds of a-iii) and b-iii) can independently be a compound selected from N-phenylaminopropyl-trimethoxysilane, bis-(γ-trimethoxysilyl-propyl)amine, N-cyclohexylaminopropyl-triethoxysilane, N-methylaminopropyl-trimethoxysilane, N-butylaminopropyl-trimethoxysilane, N-butylaminopropyl-triacyloxysilane, 3-(N-ethyl)amino-2-methylpropyl-trimethoxysilane, 4-(N-ethyl)amino-3,3-dimethylbutyl-trimethoxysilane, 4-(N- ethyl)amino-3,3-dimethylbutyl-triethoxysilane, 4-(N-ethyl) amino-3,3-dimethylbutyl-alkyldimethoxysilanes, 4-(N-ethyl)amino-3,3-dimethylbutyl-alkyldiethoxysilanes, 4-(N-ethyl)amino-3,3-dimethylbutyl-diacyloxysilanes, 3-(N-ethyl)amino-2-methylpropyl-methyldimethoxysilane and mixtures thereof.

In another embodiment of the invention, the compounds of a-iii) and b-iii) can independently be one or more compounds of formula (VI):

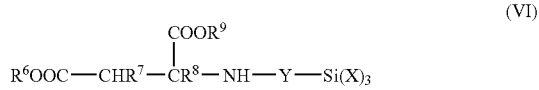

(VI)

where

X and Y are as defined above, $R^6$ and $R^9$ are linear or branched alkyl groups having 1 to 9 carbon atoms, and $R^7$ and $R^8$ are identical or different and represent hydrogen or linear or branched alkyl groups having 1 to 9 carbon atoms.

In an embodiment of the invention, the curable, alkoxysilane-functional polyether urethane composition can also include one or more plasticizers, one or more adhesion promoters, one or more catalysts, one or more desicants, one or more leveling agents, one or more wetting agents, one or more flow control agents, and or more antiskinning agents, one or more antifoaming agents, one or more fillers, one or more viscosity regulators, one or more pigments, one or more dyes, one or more ultra violet light absorbers, one or more thermal stabilizers and/or one or more antioxidants.

Non-limiting examples of plasticizers that can be used in the present invention include dioctyl phthalate (DOP) dibutyl phthalate (DBP); diisodecyl phthalate (DIDP); dioctyl adipate isodecyl malonate; diethylene glycol dibenzoate, pentaerythritol ester; butyl oleate, methyl acetylricinoleate; tricresyl phosphate and trioctyl phosphate; polypropylene glycol adipate and polybutylene glycol adipate; and the like. Such plasticizers can be used alone or in combination of two or more.

Non-limiting examples adhesion promoters that can be used in the present invention include epoxy resins, phenolic resins, silane and amino silane coupling agents known in the art, alkyl titanates and/or aromatic polyisocyanates.

Non-limiting examples of catalysts, which may be used for curing, that can be used in the present invention include titanate esters, e.g., those of tetrabutyl titanate and tetrapropyl titanate; organotin compounds, e.g., dibutyl tin dilaurate, dibutyl tin maleate, dibutyl tin diacetate, tin octylate and tin naphthenate; lead octylate; amine-based compounds and salts of these compounds and carboxylates, e.g., butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylamin-omethyl)phenol, morpholine, N-methyl morpholine, and 1,3-diazabicyclo(5,4,6) undecene-7 (DBU); low-molecular-weight polyamide resins produced by the reactions between excessive quantities of polyamines and polybasic acids; products of the reactions between excessive quantities of polyamines and epoxy compounds; and known silanol condensing catalysts, e.g., silane coupling agents containing amino group (e.g., γ-aminopropyl trimethoxy silane and N-(β-aminoethyl)aminopropyl methyldimethoxy silane). These compounds may be used either individually or in combination.

Non-limiting examples of dessicants that can be used in the present invention include calcium oxide, activated alumina, calcium chloride, silica gel, vinyltrimethoxysilane, and zinc chloride.

Non-limiting examples of leveling agents that can be used in the present invention include cellulose, e.g., nitrocellulose and cellulose acetate butyrate.

Non-limiting examples of wetting agents that can be used in the present invention include glycols, silanes, anionic surfactants, and any other wetting agents known in the art.

Non-limiting examples of flow control agents, that can be used in the present invention include polyacrylic esters, non-ionic fluorinated alkyl ester surfactants, non-ionic alkylarylpolyether alcohols, silicones, and the like, as well as those available under the tradename RESIFLOW® by Estron Chemical, Inc., Parsippany, N.J., those sold under the tradename Benzoin® by DSM, Inc.; those available under the tradename MODAFLOW® form Monsanto and those available under the tradename SURFYNOL® available from Air Products, Bethlehem, Pa.

Non-limiting examples of antiskinning agents that can be used in the present invention include lecithin, oximes, non-limiting examples being butyraldehyde oxime and methyl ethyl ketoxime, hydroquinones, non-limiting examples being 2,5-di-t-butyl-hydroquinone and the methyl esters of hydroquinone and anthraquinones.

Non-limiting examples of antifoaming agents that can be used in the present invention include those available as FOAMEX® from Rohm and Haas Company, Philadelphia, Pa., those available under the trade name BYK®, available from BYK-Chemie USA, Wallingford, Conn., and those available under the trade name FoamBrake® from BASF Corp., Mount Olive, N.J.

Non-limiting examples of fillers that can be used in the present invention include fumed silica, settling silica, silicic anhydride, silicic hydrate, talc, carbon black, limestone powder, coated and uncoated colloidal calcium carbonate, coated and uncoated ground calcium carbonate, coated and uncoated precipitated calcium carbonate, kaolin, diatomaceous earth, fired clay, clay, titanium dioxide, bentonite, organic bentonite, ferric oxide, zinc oxide, activated zinc white, and fibrous fillers such as glass fibers or filaments. The filler can have any suitable particle size, in an embodirhent of the invention, the filler particle size can be from 5 nm to 10 μm, in some cases 10 nm to 5 μm, and in other cases from 25 nm to 1 μm.

Non-limiting examples of viscosity regulators that can be used in the present invention include alkali-soluble, acid-soluble, and hydrophobically-modified alkali-soluble or acid-soluble emulsion polymers, those available as ACRYSOL® from Rohm and Haas Company, cellulosics, modified cellulosics, natural gums, such as xanthan gum, and the like.

Non-limiting examples of pigments that can be used in the present invention include silica, calcium carbonate, magnesium carbonate, titanium oxide, iron oxide and carbon black.

Non-limiting examples of dyes that can be used in the present invention include mordant dyes, i.e., dyes prepared from plants, insects, and algae, and direct dyes, non-limiting examples being those based on benzidine or benzidine derivatives.

Non-limiting examples of ultra violet light absorbers that can be used in the present invention include benzotriazole-based ultra violet ray absorbers, salicylate-based ultraviolet ray absorbers, benzophenone-based ultraviolet ray absorbers, hindered amine-based light stabilizers and nickel-based light stabilizers.

Non-limiting examples of thermal stabilizers that can be used in the present invention include HCl scavengers, a non-limiting example being epoxidized soybean oil, esters of beta-thiodipropionic acid, non-limiting examples being lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythritol tetrakis-(beta-dodecylmercapto)-propionate, and lead phosphate.

Non-limiting examples of antioxidants that can be used in the present invention include 2,6-di-t-butyl phenol, 2,4-di-t-butyl phenol, 2,6-di-t-butyl-4-methyl phenol, 2,5-di-t-butyl-hydroquinone, n-octadecyl-3-(3,5-di-t-butyl-4-hydroxyphenyl)propionate, pentaerythrityl-tetrakis[3-(3,5-di-t-butyl-4-hydroxyp-henyl)propionate], 2,2'-methylenebis(4-methyl-6-t-butyl phenol), 4,4'-butylidenebis(3-methyl-6-t-butyl phenol), 4,4'-thiobis(3-methyl-6--t-butyl phenol), N,N'-diphenyl-p-phenylenediamine, 6-ethoxy-2,2,4-trimethyl-1,2-dihydroquinoline and the antioxidants available under the trade name IRGANOX® from Ciba Specialty Chemicals, Basel, Switzerland.

Embodiments of the invention provide a coating composition, a sealant composition or an adhesive composition that includes the above-described curable, alkoxysilane-functional polyether urethane composition and one or more materials selected from one or more pigments, one or more plasticizers, and/or one or more fillers.

In the present invention, it was surprisingly found that mono-silanes, instead of di-silanes, could be used to make curable, alkoxysilane-functional polyether urethanes useful in coating, sealant and adhesive compositions. It was discovered that, while high molecular weight polyether mono-silanes were used alone, the cured product was too soft to be useful. When low molecular weight mono-silanes were used alone, the cured product was too hard to be useful. However, when the combination of high molecular weight polyether mono-silanes and low molecular weight mono-silanes in the curable compositions described above were used, coating, sealant and adhesive compositions that provide optimum physical properties in a cured product were obtained.

Suitable pigments that can be used in this embodiment include, but are not limited to perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, and azo compounds, as well as substituted derivatives thereof and mixtures thereof.

Suitable plasticizers that can be used in this embodiment include, but are not limited to those described above. Similarly, suitable fillers that can be used in this embodiment include, but are not limited to those described above.

The present invention is also directed to a method of coating a substrate including applying the above-described coating composition to at least a portion of a surface of the substrate. The invention also provides the coated substrate prepared according to the above-described method. As such, the substrate can be, but is not limited to one or more materials selected from wood, metals, plastics, paper, ceramics, minerals, stone, glass, and concrete. In particular embodiments, the substrates can include wood, metals such as ferrous substrates and aluminum substrates, and plastics.

The coating composition can be applied by conventional means including brushing, dipping, flow coating, spraying, and the like. Upon application to a substrate, the composition is allowed to coalesce to form a substantially continuous film on the substrate. The film is formed on the surface of the substrate by driving off liquids out of the film by heating or by an air drying period.

The present invention also provides a method of joining a first adherend and a second adherend including
  applying the above-described adhesive composition to at least a portion of a surface of the first adherend and to at least a portion of a surface of the second adherend;
  contacting the adhesive composition containing surface of the first adherend with the adhesive composition containing surface of the second adherend to form a bonded assembly; and
  curing the adhesive compositions in the bonded assembly.

The method of joining provides an assembly. The assembly includes the first adherend and the second adherend, which independently include one or more materials selected from wood, metals, plastics, paper, ceramics, minerals, stone, glass, and concrete.

The present invention is more particularly described in the following examples, which are intended to be illustrative only, since numerous modifications and variations therein will be apparent to those skilled in the art. Unless otherwise specified, all parts and percentages are by weight.

EXAMPLES

Example 1

The example demonstrates the preparation of a silane functional aspartate according to the invention. The aspartate resin was prepared according to U.S. Pat. No. 4,364,955 to Kramer et al. To a 5-liter flask, fitted with agitator, thermocouple, nitrogen inlet, addition funnel and condenser was added 1483 g (8.27 equivalents (eq.)) of 3-aminopropyltrimethoxysilane followed by 1423.2 (8.27 eq.) diethyl maleate over a two hour period at 25° C., and held at that temperature for five hours. The unsaturation number, determined by iodine titration, was 0.6, indicating that the reaction was approximately 99% complete. The viscosity was 11 cps measured using a Brookfield® Digital Viscometer, Model DV-II+, Brookfield Engineering, Inc., Middleboro, Mass., spindle 52, 100 rpm at 25° C.

Example 2

This example describes the preparation of a silane terminated polyurethane (STP 1) according to the invention. To a 5-liter, round bottom flask equipped with an agitator, nitrogen inlet, addition funnel, and condenser was added 150.9 g (1.1 eq.) of isophoronediisocyanate, 3664.1 g (0.6 eq) polyether monool having a an equivalent weight of 6411 prepared as described in U.S. Pat. No. 4,355,188, and 0.6 g dibutyltin dilaurate. The reaction was heated to 60° C. for three hours after which the NCO content was 0.65 wt. % by NCO titration (theoretical =63%). The silane functional aspartate of Example 1, 202.2 g (0.57 eq) was then added and the mixture maintained at 60° C. for 60 minutes, after which, no NCO groups could be detected by IR. At this point 20 g of vinyl trimethoxysilane was added as a moisture scavenger. The viscosity was 16,100 cps at 25° C.

Example 3

This example describes the preparation of a silane terminated polyurethane (STP 2) according to the invention. To a 5-liter, round bottom flask equipped with an agitator, nitrogen inlet, addition funnel, and condenser was added 366.7 g (3.3 eq.) of isophoronediisocyanate, 122.7 g (0.165 eq) n-butanol and 0.2 g dibutyltin dilaurate. The reaction was heated to 60° C. for three hours after which the NCO content was 14 wt. % by NCO titration (theoretical=14.2%). The silane functional aspartate of Example 1, 605.1 g (1.65 eq) was then added and the mixture maintained at 60° C. for 60 minutes, after which, no NCO groups could-be detected by IR. At this point 5.5 g of vinyl trimethoxysilane was added as a moisture scavenger. The viscosity was 242,000 cps at 25° C.

Example 4

This example describes the preparation of silane sealants according to the invention. The sealant formula was:

| | |
|---|---|
| 37.5 wt. % | Prepolymer Blend |
| 17.5 wt. % | JAYFLEX ® DIDP, Diisodecyl Phthalate available from ExxonMobil Chemical Corp., Houston, TX |
| 0.8 wt. % | SILQUEST ® A-1120, amino silane available from Crompton Corp., Middlebury, CT |
| 0.1 wt. % | dibutyltin dilaurate |
| 0.5 wt. % | SILQUEST ® A-171, vinyl trimethoxysilane available from Crompton Corp. |

A high speed centrifugal mixer was used to combine the above-listed ingredients for one minute at a mix speed of 2,200 rpm. A filler material, Ultra PFlex® (0.07 m coated precipitated calcium carbonate) available from Minerals Technology, Inc., New York, N.Y., was added in two parts to make up 43.6 wt. % of the formulation. A first portion 23.6 of the 43.6 wt. % portion was added and mixed into the mixture for one minute at 2,200 rpm. The remaining filler, 20 of the 43.6 wt. % was added and mixed into the mixture for one minute at 2,200 rpm. The entire contents were then mixed an additional one minute at 2,200 rpm. The final material was then degassed at 50° C. under vacuum (<28 mm Hg) for one hour.

The following sealant compositions were formulated (prepolymer blend indicated by weight ratios) by mixing the following ingredients together:

| | STP 1 | STP 2 | Disilane[3] | UTS (psi)[1] | Modulus (psi)[2] | Elongation (%) |
|---|---|---|---|---|---|---|
| 4A | 100 | 0 | 0 | | Soft, brittle | sticky |
| 4B | 0 | 100 | 0 | | | |
| 4C | 70 | 30 | 0 | 333 | 126 | 427 |
| 4D | 0 | 0 | 100 | 223 | 77 | 498 |

[1]Ultimate Tensile Strength
[2]Modulus at 100% Elongation
[3]Kanegafuchi M203 disilane available from Kaneka America Corp., New York, NY.

The data demonstrate that a silane sealant based on a high molecular weight polyether monool is too soft to be useful; a silane sealant based on a low molecular weight monool is too hard to be useful; but a mixture of the two gives a sealant that compares favorably to a sealant based on a commercially available disilane. This result was heretofore unknown.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A curable, alkoxysilane-functional polyether urethane composition formed by combining
   a) a first silane terminated polyurethane prepared by reacting:
      i) at least one mono-functional compound selected from the group consisting of polyethers, amines, amine terminated polyethers, or polysulfides having a hydroxyl, amine or thiol functional group, and mixtures thereof, having a number average molecular weight of from 500 to 20,000, and having a structure according to formula (III):

$$R^2\text{-}(\text{-}Z\text{-}CR^3{}_n\text{-})_m\text{-}Z\text{-}H \tag{III}$$

wherein $R^2$ represents a $C_1$-$C_{22}$ linear branched or cyclic alkyl, aryl, aralkyl, alkaryl, or alkenyl group; each occurrence of $R^3$ is independently a H, methyl or ethyl group, n is from 1 to 5, m is from 10 to 1,000; and each occurrence of Z is independently an O, S or —$NR^4$-group, wherein $R^4$ is an H, methyl, ethyl, propyl, n-butyl or t-butyl group with
      ii) an isocyanate component containing two isocyanate groups, the reaction product of i) and ii) reacted with
      iii) a compound containing an isocyanate-reactive group and at least one reactive silane group in which at least 10 mole % of component iii) is a compound corresponding to formula (I)

$$\begin{array}{c} R1 \\ | \\ HN\text{—}Y\text{—}Si\,(X)_3 \end{array} \tag{I}$$

wherein
   X represents identical or different organic groups which are inert to isocyanate groups below 100° C., provided that at least two of these groups are alkoxy or acyloxy groups,
   Y represents a linear or branched alkylene group containing 1 to 8 carbon atoms and
   $R_1$ represents an organic group which is inert to isocyanate groups at a temperature of 100° C. or a group corresponding to formula II $$\text{—}Y\text{—}Si\text{—}(X)_3 \tag{II}$$

to form a moisture-curable, alkoxysilane-functional polyether urethane; and
   b) a second silane terminated polyurethane prepared by reacting:
      i) n-propanol or n-butanol or t-butanol with
      ii) an isocyanate component containing two isocyanate groups, the reaction product of i) and ii) reacted with
      iii) a compound containing an isocyanate-reactive group and at least one reactive silane groups corresponding to formula (I) as defined above.

2. The composition of claim 1, wherein the mono-functional compound in a-i) is a monohydroxy-functional polyether.

3. The composition of claim 2, wherein the polyether is a poly(propyleneoxide) or poly(ethyleneoxide).

4. The composition of claim 1, wherein the isocyanate components of a-ii) and b-ii) are independently selected from diisocyanates represented by formula (IV):

$$R^5(NCO)_2 \tag{IV}$$

wherein R⁵ is selected from the group consisting of a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

5. The composition of claim 1, wherein the isocyanate components of a-ii) and b-ii) are independently selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-and 1,4-diisocyanate, 1-isocyanato-2-isocyanatomethyl cyclopentane, 1-isocyanato-3-isocyanatomethyl-3,5,5-trimethyl-cyclohexane, bis-(4-isocyanato-cyclohexyl)-methane, 1,3- and 1,4-bis-(isocyanatomethyl)-cyclohexane,bis-(4-isocyanatocyclo-hexyl)-methane, 2,4'-diisocyanato-dicyclohexyl methane, bis- (4-isocyanato-3-methyl-cyclohexyl)-methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydro-toluylene diisocyanate, 1,3- and/or 1,4-phenylene dilsocyanate, 2,4- and/or 2,6-toluylene diisocyanate, 2,4- and/or 4,4'-diphenylmethane diisocyanate and 1,5-diisocyanato naphthalene and mixtures thereof.

6. A curable, alkoxysilane-functional polyether urethane composition formed by combining
    a) a first silane terminated polyurethane prepared by reacting:
        i) at least one mono-functional compound selected from the group consisting of polvethers, amines, amine terminated polyethers, or polysulfides having a hydroxyl, amine or thiol functional group, and mixtures thereof, having a number average molecular weight of from 500 to 20,000, and having a structure according to formula (III):

R²—(-Z-CR³ₙ-)ₘ-Z-H    (III)

wherein R² represents a C₁-C₂₂ linear branched or cyclic alkyl, aryl, aralkyl, alkaryl, or alkenyl group; each occurrence of R³ is independently a H, methyl or ethyl group, n is from 1 to 5, m is from 10 to 1,000; and each occurrence of Z is independently an O, S or
                —NR⁴-group, wherein R⁴ is an H, methyl, ethyl, propyl, n-butyl or t-butyl group with
        ii) an isocyanate component containing two isocyanate groups, the reaction product of i) and ii) reacted with
        iii) a compound containing an isocyanate-reactive group and at least one reactive silane group corresponding to structure (V):

HN—[Y—Si—(X)₃]₂ wherein
            X represents identical or different organic groups which are inert to isocyanate groups below 100° C., provided that at least two of these groups are alkoxv or acvloxv groups, and
            Y represents a linear or branched alkylene group containing 1 to 8 carbon atoms
                to form a moisture-curable, alkoxysilane-functional polyether urethane; and
    b) a second silane terminated polyurethane prepared by reacting:
        i) a C₁-C₂₀ linear, branched or cyclic alkyl monofunctional alcohol, amine, and/or thiol with
        ii) an isocyanate component containing two isocyanate groups, the reaction product of i) and ii) reacted with
        iii) a compound containing an isocyanate-reactive group and at least one reactive silane group corresponding to structure (V):

HN—[Y—Si—(X)₃]₂ wherein Y and X are defined as above.

7. The composition of claim 1, wherein the compound of a-iii) and b-iii) is a compound selected from the group consisting of N-phenylaminopropyl-trimethoxysilane, bis-(γ-trimethoxysilylpropyl)amine, N-cyclohexylaminopropyl-triethoxysilane, N-methylaminopropyl-trimethoxysilane, N-butylaminopropyl-trimethoxysilane, N-butylaminopropyl-triacyloxysilane, 3-(N-ethyl)amino-2-methylpropyl-trimethoxysilane, 4-(N-ethyl)amino-3,3-dimethylbutyl-trimethoxysilane, 4-(N-ethyl)amino-3,3-dimethylbutyl-triethoxysilane, 4-(N-ethyl)amino-3,3-dimethylbutyl-alkyldimethoxysilanes, 4-(N-ethyl)amino-3,3-dimethylbutyl-alkyldiethoxysilanes, 4-(N-ethyl)amino-3,3-dimethylbutyl- diacyloxysilanes, and 3-(N-ethyl)amino-2-methylpropyl-methyldimethoxysilane.

8. The composition of claim 1, wherein the compound of a-iii) and b-iii) is a compound of formula (VI):

$$R^6OOC-CHR^7-\overset{COOR^9}{\underset{|}{C}}R^8-NH-Y-Si(X)_3 \quad (VI)$$

wherein
    X and Y are as defined above,
    R₂ and R₅ are alkyl groups having 1 to 9 carbon atoms, and
    R₃ and R₄ are identical or different and represent hydrogen or alkyl groups having 1 to 9 carbon atoms.

9. The composition of claim 1 further comprising one or more plasticizers, one or more adhesion promoters, one or more catalysts, and/or one or more dessicants, one or more leveling agents, one or more wetting agents, one or more flow control agents, one or more antiskinning agents, one or more antifoaming agents, one or more fillers, one or more viscosity regulators, one or more pigments, one or more dyes, one or more ultra violet light absorbers, one or more thermal stabilizers and/or one or more antioxidants.

10. The composition of claim 1, wherein
    a-i) is present at from 40 to 99 percent by weight of the composition,
    a-ii) is present at from 0.5 to 30 percent by weight of the composition,
    a-iii) is present at from 0.5 to 35 percent by weight of the composition,
    b-i) is present at from 2 to 30 percent by weight of the composition,
    b-ii) is present at from 25 to 60 percent by weight of the composition, and
    b-iii) is present at from 20 to 65 percent by weight of the composition.

11. The composition of claim 1, wherein the NCO:OH equivalent ratio for a-ii to a-i) is from 1.5:1 to 2.5:1.

12. The composition of claim 1, wherein the NCO:OH equivalent ratio for b-ii) to b-i) is from 1.5:1 to 2.5:1.

13. The composition of claim 1, wherein the NCO:NH equivalent ratio of the reaction product of a-i) and a-ii) to component a-iii) is from 1.5:1 to 2.5:1.

14. The composition of claim 1, wherein the NCO:NH equivalent ratio of the reaction product of b-i) and b-ii) to component b-iii) is from 1.5:1 to 2.5:1.

15. The composition of claim 1, wherein the first silane terminated polyurethane a) is present at from 45 to 90 percent by weight of the composition and the second silane terminated polyurethane b) is present at from 10 to 55 percent by weight of the composition.

16. A coating composition, sealant composition or adhesive composition comprising the composition of claim 1 and one or more pigments, one or more plasticizers, or one or more fillers.

17. A method of coating a substrate comprising applying the coating composition of claim 16 to at least a portion of a surface of the substrate.

18. A coated substrate prepared according to the method of claim 17.

19. The method of claim 17, wherein the substrate comprises one or more materials selected from the group consisting of wood, metals, plastic, paper, ceramics, minerals, stone, glass, and concrete.

20. The coated substrate of claim 18, wherein the substrate comprises one or more materials selected from the group consisting of wood, metals, plastic, paper, ceramics, minerals, stone, glass, and concrete.

21. A method of joining a first adherend and a second adherend comprising
applying the adhesive composition of claim 16 to at least a portion of a surface of the first adherend and to at least a portion of a surface of the second adherend;
contacting the adhesive composition containing surface of the first adherend with the adhesive composition containing surface of the second adherend to form a bonded assembly; and
curing the adhesive compositions in the bonded assembly.

22. An assembly formed according to the method of claim 21.

23. The assembly according to claim 22, wherein the first adherend and the second adherend are independently comprised of one or more materials selected from the group consisting of wood, metals, plastics, paper, ceramics, minerals, stone, glass, and concrete.

24. The method of claim 21, wherein the first adherend and the second adherend are independently comprised of one or more materials selected from the group consisting of wood, metals, plastics, paper, ceramics, minerals, stone, glass, and concrete.

* * * * *